March 11, 1969   R. E. MURRELL   3,431,836
PIE PAN HOLDER
Filed April 10, 1967

INVENTOR.
RUBY E. MURRELL
BY *John H. Widdowson*
*Phillip A. Rein*
ATTORNEYS

United States Patent Office 3,431,836
Patented Mar. 11, 1969

3,431,836
PIE PAN HOLDER
Ruby E. Murrell, 3345 Salina, Wichita, Kans. 67204
Filed Apr. 10, 1967, Ser. No. 629,555
U.S. Cl. 99—433                                           7 Claims
Int. Cl. A21b 5/00; A47j 37/01

ABSTRACT OF THE DISCLOSURE

This invention relates to a support structure usable with a cooking receptacle to hold the same primarily during a baking operation and, more particularly, this invention relates to a support structure operable to hold a pie pan and related ingredients therein during the baking thereof to provide even cooking and prevent discharge of liquid ingredients into the oven area. More specifically, this invention relates to a support structure operable to receive and secure a conventional pie pan in a manner to prevent leakage of the ingredients therefrom and having an elevated splash and heat guard member providing for the production of an evenly cooked pie member.

---

Numerous types of pie pan support structures are known to the prior art operable to receive and retain the heated juices discharged from a cooking pie during a normal baking operation in, for example, a production line type system. However, the loss of the pie juices during the baking operation is not desirable as a consistently high quality pie is impossible to achieve when having a variable loss of liquids therefrom. The prior art devices do not permit the free flow of heat thereabout to provide for the consistently uniform heating of the respective pie pans and ingredients therein. Additionally, the prior art devices merely provide receptacles to hold the overflow juices during the cooking thereof but fail to provide means to retain the juices therein and achieve the uniform baking essential in high quality production.

In accordance with the present invention, a new support structure operable to hold a pie pan member, normally during a cooking operation, is provided which includes a main support assembly having a splash and heat guard member releasably connected thereto. The support assembly is provided with an upright cylindrical base having a support flange secured thereto and laterally extended handle members for the easy conveyance thereof. The support flange is provided with an inwardly extended rim section adapted to support a pie pan or the like thereon. The rim section has an innermost edge portion converging upwardly to form a liquid receiving area. The splash and heat guard is provided with a main cylindrical body and an integral, upwardly converging guard section. The cylindrical body is adaptable to slidably engage the inner surface of the base with the guard section overlying the pie pan. The support flange is of a diameter slightly greater than the pie pan and the cylindrical body of the splash and heat guard, when assembled, is engageable with the upper surface of the pie pan thereby providing a sealed support structure usable in, for example, baking pies to retain the juices therein plus reflecting heat by the guard section to achieve a uniform temperature throughout the pie.

Accordingly, it is an object of this invention to provide a new support structure overcoming the above-mentioned disadvantages of the prior art devices.

Another object of this invention is to provide a support structure operable to support a pie pan or the like above a supporting surface providing for the even heating thereof and having a splash and heat guard member operable to reflect and radiate heat into the cooking ingredients for a resultant uniform end product.

One other object of this invention is to provide a support structure having a main support base assembly, an inwardly extended rim portion adapted to support a pie pan or the like, and a splash and heat guard member mountable upon the support base assembly engageable with the pie pan operable to retain juices within the pie pan structure to achieve a uniform end product.

A further object of this invention is to provide a pie pan support structure having an upright support base with an inwardly extended rim portion operable to receive and retain juices from a supported cooking receptacle to prevent the discharge of the juices within the oven area.

Still, one further object of this invention is to provide a support structure usable in cooking pies on a production line basis that is simple to use, reliable in operation, and economical in capital investment.

Various other objects, advantages, and features of the invention will become apparent to those skilled in the art from the following discussion, taken in conjunction with the accompanying drawings, in which.

Figure 1:
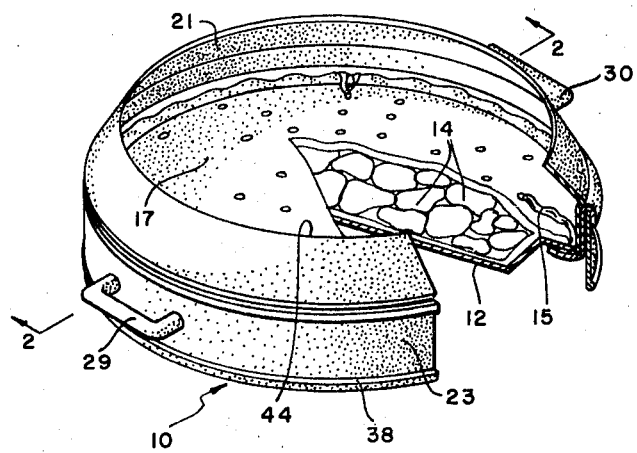
FIG. 1 is a perspective view of the support structure of this invention illustrated as having a pie containing pie pan therein with a portion broken away for clarity.

The following is a discussion and description of preferred embodiments of the new support structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular FIG. 1, a support structure of this invention, indicated generally at 10, is illustrated as supporting, for example, a pie pan 12 having ingredients therein in the form of solids 14 and liquids 15 covered by pie dough 17 in a conventional pie making manner.

The support structure 10 includes a main support housing or assembly 19 having a shield or splash and heat guard 21 releasably connected thereto. The support assembly 19 is of a two-piece construction having a cylindrical base 23 with a support flange member 25 secured about an upper edge 26 thereof. The cylindrical base 23 has a rolled lower edge 28 adapted to rest upon a supporting surface as within an oven or in a cooling area. A pair of diametrically opposed handle members 29 and 30 are secured as by welding or the like to an outer surface of the base 23 usable to lift and convey the support structure 10 in an easy manner.

More specifically, the support flange member 25 has a reversely bent top edge 31 of U-shape in transverse cross-section engageable in a clamped relationship with the upper edge of the base 23 and a cylindrical body portion 33 extended downwardly in contact with the inner surface of the cylindrical base 23. The lower section of the flange member 25 is bent inwardly to form an annular rim portion 34 having an enlarged opening 36 adapted to receive the pie pan 12 therein. The rim portion 34 has an innermost edge 38 bent upwardly at approximately a 5 degree angle to form a reservoir area 39 between the same and the body portion 33 for reasons to be explained.

Figure 2:
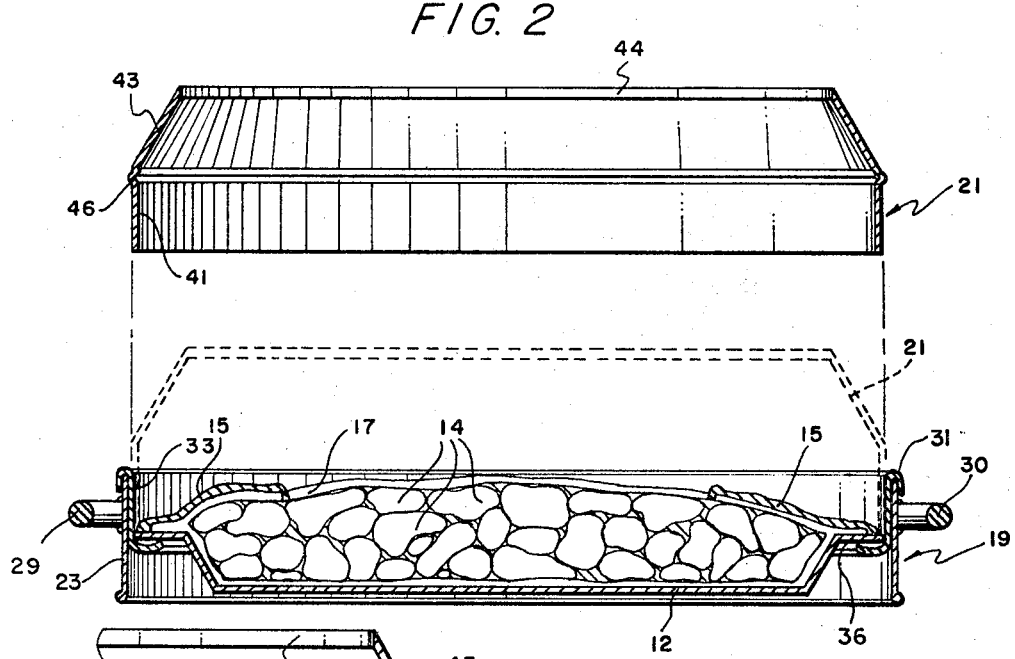
FIG. 2 is a sectional view taken along lines 2—2 in FIG. 1 with a splash and heat guard member thereof illustrated in an exploded position for clarity.
Figure 3:
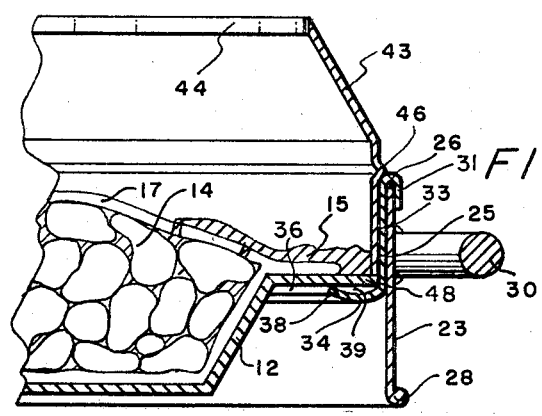
FIG. 3 is a fragmentary enlarged sectional view illustrating the pie juice retaining feature of the pie pan support structure of this invention.

As shown in FIGS. 2 and 3, the splash and heat guard 21 includes a cylindrical body 41 integral with an upwardly converging guard section 43 having a central opening 44. At the junction of the guard section 43 and the body 41 is an outwardly extended annular ridge or dimple 46 for reasons to become obvious. The outer diameter of the cylindrical body 41 is of a size adapted to fit snugly within the inner surface of the cylindrical base 23 as shown in FIG. 3 to form a seal therebetween.

In the use and operation of the support structure 10 of this invention in, for example, an assembly line production of pies, the splash and heat guard 21 is removed from engagement with the support assembly 19 providing for the placement of a pie pan 12 containing the ingredients therein. As shown in FIG. 3, the diameter of the pie pan 12 is slightly less than the internal diameter of the body portion 33 of the support flange member 25 so that an outer rim edge 48 of the pie pan 12 is positioned adjacent thereto. It is noted that the vertical position of the annular rim portion 34 is positioned relative to the rolled lower edge 28 of the cylindrical base 23 so that the pie pan 12 is elevated above a support surface of an oven or the like. The splash and heat guard 21 is thereupon mounted upon the support assembly 19 with the inner surface of the cylindrical body 41 contacting the upper portion of the support flange member 25 to form a seal therebetween. The lowermost edge of the cylindrical body 41 contacts an upper surface of the rim edge 48 of the pie pan 12 thereby forming a seal therebetween. It is seen that in the assembled position, the guard section 43 extends inwardly so as to be in overlying relationship to the pie pan 12 and the ingredients for reasons to become obvious.

In the use of the support structure 10 in the preparation and cooking of a conventional pie member, it is seen that during the cooking or baking operation, the overflow of the juices 15 outwardly over the pie dough 17 is engageable with the inner surface of the cylindrical body 41 of the splash and heat guard 21 to prevent the loss thereof. It is obvious that on the expansion of the ingredients due to the heated condition thereof, the juices 15 move outwardly into contact with the cylindrical body 41, which being heated, results in a cooking of the juices 15 at the junction of the splash and heat guard 21 and the pie pan 12 to additionally aid in forming a seal therewith. The vertical relationship of the pie pan 12 and the contacting seal of the splash and heat guard 21 operates to form a barrier permitting the juices 15 to flow back inwardly into the pie which is highly desirable in preventing the loss of liquids or juices 15 therefrom. It is also seen that the reservoir area 39 between the edge 38 and the body portion 33 is adaptable to receive any juices 15 that might escape between the contacting surfaces of the splash and heat guard 21 and the pie pan 12 to prevent the same from moving downwardly into the oven area as such deposit is highly undesirable. It is also noted that the overhanging relationship of the splash and heat guard 21 relative to the pie pan 12 acts to retain heat within the cooking area and also to reflect heat back into the pie providing for the overall and uniform heating thereof so that the pie is evenly cooked throughout. Additionally, the spaced relationship of the bottom surface of the pie pan 12 relative to the lower edge of the support structure 10 maintains the pie pan 12 elevated thereby providing for the free flow of heated gases and air within the oven thereabout again aiding in the uniform cooking of the pie.

Although the support structure 10 of this invention has been described and illustrated as operable in the mass production of pies, it is obvious that the same structure can be used for cooking beans, stews, and the like wherever it is highly desirable to retain the juices and ingredients within the cooking structure in order to achieve a uniform, final product.

As will be apparent from the foregoing description of the preferred embodiments of applicant's new and novel support structure, relatively simple and inexpensive means have been provided usable with conventional cooking receptacles operable to retain the liquids therein and prevent the loss of liquids onto the cooking over area thereby providing a great savings in labor normally required in cleaning operations. Applicant's construction also results in a new and novel structure providing for the overall and even heating and cooking of a pie member or the like with a shield member operable to retain the heated liquids and the like from splashing therefrom.

While the invention has been described in connection with preferred specific embodiments thereof, it will be understood that this description is intended to illustrate not to limit the scope of the invention, which is defined by the following claims.

I claim:

1. A support structure operable to hold, for example, a pie pan and ingredients therein during a baking operation, comprising:
    (a) a support assembly having an upright sidewall and an inwardly extended annular ledge located below the top of said sidewall adapted to support the pie pan thereon, and
    (b) a shield member mountable in engagement with the inner surface of said sidewall and the upper surface of the outer rim of the pie pan to restrict movement of liquids from the ingredients during the baking operation thereby preventing liquid leakage into the oven area and achieving a uniform final product.

2. A support structure as described in claim 1, wherein:
    (a) said shield member having an upright cylindrical body integral with a guard portion outwardly converging therefrom, and
    (b) said cylindrical body mountable in sliding engagement with said sidewall to hold the pie pan therein.

3. A support structure as described in claim 2, wherein:
    (a) said shield member having an enlarged opening to permit heat flow to the ingredients and operable to reflect heat and prevent the discharge of the ingredients therefrom during heating into the baking area.

4. A support structure as described in claim 1, wherein:
    (a) said annular ledge having an innermost portion inclined upwardly toward said shield member operable to engage the pie pan in sealing relationship, and
    (b) said innermost portion operable to form an annular reservoir to retain any liquid leakage from the ingredients past the contacting outer rim of the pie pan and said shield member.

5. A support structure as described in claim 1, wherein:
    (a) said annular ledge positioned above the lower support edge of said sidewall a distance greater than the depth of the pie pan whereby the heat during the baking operation freely circulates about the pie pan.

6. A support structure as described in claim 1, wherein:
    (a) said shield member having a splash and heat guard section integral with a cylindrical body,
    (b) said body mounted in contact with said sidewall, and
    (c) said guard section outwardly converging to overlie the pie pan to reflect heat therewithin for uniform cooking and to deflect heated ingredients therein to maintain a clean baking area.

7. A support structure as described in claim 1, wherein:
    (a) said support assembly having a pair of laterally extended handle members for conveyance of said support structure and contents therein.

(References on following page)

References Cited

UNITED STATES PATENTS

| | | |
|---|---|---|
| 1,058,088 | 4/1913 | Muzzy. |
| 2,026,829 | 1/1936 | Ellinger _____ 99—433 XR |
| 2,189,241 | 2/1940 | Damon. |
| 2,287,309 | 6/1942 | Howard. |
| 2,583,887 | 1/1952 | Schneeweiss. |

FOREIGN PATENTS

| | | |
|---|---|---|
| 824,727 | 12/1959 | Great Britain. |
| 850,663 | 7/1952 | Germany. |

WALTER A. SCHEEL, *Primary Examiner.*

A. O. HENDERSON, *Assistant Examiner.*

U.S. Cl. X.R.

99—444